US010432789B2

(12) United States Patent
Winter et al.

(10) Patent No.: US 10,432,789 B2
(45) Date of Patent: Oct. 1, 2019

(54) CLASSIFICATION OF TRANSCRIPTS BY SENTIMENT

(71) Applicant: Verint Systems Ltd., Herzliya Pituach (IL)

(72) Inventors: Yaron Winter, st. Petach Tikva (IL); Saar Carmi, st. Kiryat Ono (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 305 days.

(21) Appl. No.: 15/428,599

(22) Filed: Feb. 9, 2017

(65) Prior Publication Data
US 2018/0226071 A1    Aug. 9, 2018

(51) Int. Cl.
| G10L 15/18 | (2013.01) |
| G10L 15/197 | (2013.01) |
| G10L 15/02 | (2006.01) |
| G10L 25/63 | (2013.01) |
| G06F 17/21 | (2006.01) |
| G10L 15/06 | (2013.01) |
| H04M 3/51 | (2006.01) |
| G06F 17/27 | (2006.01) |

(52) U.S. Cl.
CPC ........ *H04M 3/5183* (2013.01); *G06F 17/277* (2013.01); *G06F 17/279* (2013.01); *G06F 17/2785* (2013.01); *G10L 15/063* (2013.01); *G10L 15/197* (2013.01); *H04M 2201/40* (2013.01); *H04M 2203/2061* (2013.01)

(58) Field of Classification Search
CPC .......... H04M 3/5183; H04M 2201/40; H04M 2203/2061; G06F 17/279; G06F 17/2785; G06F 17/277; G10L 15/197; G10L 15/063

USPC ........................................................ 704/235
See application file for complete search history.

(56) References Cited

U.S. PATENT DOCUMENTS

| 5,761,687 | A | * | 6/1998 | Hon | G06F 17/273 |
| | | | | | 704/246 |
| 6,925,455 | B2 | * | 8/2005 | Gong | G06K 9/6293 |
| | | | | | 706/45 |
| 7,149,687 | B1 | * | 12/2006 | Gorin | G10L 15/063 |
| | | | | | 704/243 |
| 7,487,094 | B1 | * | 2/2009 | Konig | G10L 15/19 |
| | | | | | 379/88.01 |
| 8,086,549 | B2 | * | 12/2011 | Qi | G06N 20/00 |
| | | | | | 706/14 |
| 8,543,398 | B1 | * | 9/2013 | Strope | G10L 15/063 |
| | | | | | 704/235 |
| 8,554,559 | B1 | * | 10/2013 | Aleksic | G10L 15/30 |
| | | | | | 704/235 |

(Continued)

OTHER PUBLICATIONS

Levenshtein, V.I., "Binary Codes Capable of Correcting Deletions, Insertions, and Reversals," Soviet Physics-Doklady, vol. 10, No. 8, 1966, pp. 707-710.

(Continued)

*Primary Examiner* — Edwin S Leland, III
(74) *Attorney, Agent, or Firm* — Meunier Carlin & Curfman LLC

(57) ABSTRACT

A system and method for distinguishing the sentiment of utterances in a dialog is disclosed. The system utilizes a lexicon that is expanded from a seed using unsupervised machine learning. What results is a sentiment classifier that may be optimized for a variety of environments (e.g., conversation, chat, email, etc.), each of which may communicate sentiment differently.

19 Claims, 4 Drawing Sheets

(56) References Cited

U.S. PATENT DOCUMENTS

| | | | | |
|---|---|---|---|---|
| 8,571,859 B1* | 10/2013 | Aleksic | ............... | G10L 15/07 704/231 |
| 8,805,684 B1* | 8/2014 | Aleksic | ............... | G10L 15/07 704/231 |
| 8,880,398 B1 | 11/2014 | Aleksic et al. | | |
| 9,123,333 B2* | 9/2015 | Amarilli | ............... | G10L 15/08 |
| 9,202,461 B2* | 12/2015 | Biadsy | ............... | G10L 15/183 |
| 9,460,722 B2 | 10/2016 | Sidi et al. | | |
| 9,503,579 B2* | 11/2016 | Watson | ............... | H04M 3/5175 |
| 9,508,346 B2 | 11/2016 | Achituv | | |
| 9,563,622 B1* | 2/2017 | Anderson | ............... | G06F 17/2785 |
| 2003/0055640 A1* | 3/2003 | Burshtein | ............... | G06K 9/6297 704/235 |
| 2009/0193011 A1* | 7/2009 | Blair-Goldensohn | ............... | G06F 16/345 |
| 2009/0193328 A1* | 7/2009 | Reis | ............... | G06F 16/345 715/231 |
| 2009/0222395 A1* | 9/2009 | Light | ............... | G06F 17/278 706/47 |
| 2013/0018824 A1* | 1/2013 | Ghani | ............... | G06N 20/00 706/12 |
| 2013/0173254 A1* | 7/2013 | Alemi | ............... | G06F 17/28 704/9 |
| 2014/0142940 A1 | 5/2014 | Ziv et al. | | |
| 2014/0142944 A1* | 5/2014 | Ziv | ............... | G10L 17/02 704/250 |
| 2014/0222419 A1* | 8/2014 | Romano | ............... | G06F 16/367 704/10 |
| 2014/0222476 A1* | 8/2014 | Romano | ............... | G06Q 10/063 705/7.11 |
| 2015/0025887 A1* | 1/2015 | Sidi | ............... | G10L 17/02 704/245 |
| 2015/0066502 A1* | 3/2015 | Achituv | ............... | G10L 15/07 704/235 |
| 2015/0066503 A1* | 3/2015 | Achituv | ............... | G10L 15/26 704/235 |
| 2015/0112981 A1* | 4/2015 | Conti | ............... | G06F 16/951 707/730 |
| 2015/0286627 A1* | 10/2015 | Chang | ............... | G06F 17/2705 704/9 |
| 2016/0217792 A1 | 7/2016 | Gorodetski et al. | | |
| 2016/0217793 A1* | 7/2016 | Gorodetski | ............... | G10L 17/04 |
| 2017/0053653 A1 | 2/2017 | Sidi et al. | | |
| 2017/0060996 A1* | 3/2017 | Das | ............... | G06F 17/277 |
| 2017/0220677 A1* | 8/2017 | Kazi | ............... | G06F 16/35 |
| 2018/0114337 A1* | 4/2018 | Li | ............... | G06T 7/73 |
| 2018/0226071 A1* | 8/2018 | Winter | ............... | G10L 15/197 |

OTHER PUBLICATIONS

Viterbi, A.J., "Error Bounds for Convolutional Codes and an Asymptotically Optimum Decoding Algorithm," IEEE Transactions on Information Theory, vol. 13, No. 2, 1967, pp. 260-269.

Xu, H., et al., "Minimum Bayes Risk decoding and system combination based on a recursion for edit distance," Computer Speech & Language, vol. 25, Issue 4, 2011, pp. 802-828.

* cited by examiner

CLASSIFICATION OF TRANSCRIPTS BY SENTIMENT

FIELD OF THE INVENTION

The present disclosure relates to the analysis of dialogue documents (e.g., transcripts) to determine a speaker's sentiment (e.g., positive, negative, etc.). More specifically, the present disclosure relates to a system and method for classifying dialog sentiment using a lexicon generated by an unsupervised learning process and an unannotated training set of dialog transcripts.

BACKGROUND

Recording dialogs is a common business practice. The dialogs may be voice (e.g., telephone) or text (e.g., chat, email, website comments, etc.) and may represent discussion between individuals (e.g., between a customer and a customer service agent) or may represent statements from a single individual (e.g., product buyer/user). For the purposes of this disclosure, the term "transcript" will be used to refer generally to any of these cases.

Transcripts of a dialog may be created in real-time as part of a recording process or in batch-mode as part of an archiving process. In some cases, a transcription may in a voice-to-text conversion and/or a speaker separation (e.g., diarization). In other cases (e.g., email, chat, etc.), a transcript is provided or recorded as-is with no conversion or separation. Transcripts are typically text documents that may include associated transcript data describing additional features associated with the dialog, (e.g., time-stamp, dialog type, speaker identity, etc.).

Often it is desirable to identify the sentiment (e.g., feeling, emption, attitude, judgement, thought, etc.) of a dialog participant from the content of a dialog transcript. For example, a transcript of an unhappy customer may trigger sending the customer a coupon to improve relations and/or ensure loyalty. In another example, transcripts with a sentiment identified as negative (e.g., negative review, irate customer call) may be used for product/process improvement and/or agent training. Thousands of dialog transcripts may be generated daily in businesses (e.g., call centers, commercial websites, etc.). Thus, a need exists for the sentiment classification to be automated.

Classifying the sentiment of a dialog transcript (e.g., from a business transaction) is challenging because people express emotion in a variety of ways. Negative emotions may be distinguished implicitly for some statements (e.g., "they should have called me") but not for others. For example, some statements or questions (e.g., "I originally asked to cancel my account on February 26th") may be interpreted as either a neutral (e.g., informative) statement or as a negative comment. Knowledge of the context surrounding a statement may help to distinguish its corresponding sentiment. For example, "let me get this straight" may be a simple request for clarification or may be a strongly negative expression—the choice of which depends on the context. Further, the communication environment also has a great impact on sentiment classification. For example, keywords, punctuations, and phrases that indicate a negative sentiment in an email or chat may be poor indicators of negative sentiment in a transcript of a telephone call, and vice versa. Thus, a need exists for the sentiment classification to accommodate implicit interpretations, context-dependent interpretations, and environment-dependent interpretations.

Classification is also challenging because sentiment has a subjective aspect. For example, indicators of negative sentiment may vary by culture, region, or language. Thus, a need exists for the sentiment classification to accommodate cultural, regional, business practice, or language variations.

Classification is also challenging because the difference between sentiments in a conversation may be subtle. For example, the detectable differences between a negative dialog and a neutral dialog in transcripts from a customer service center may be slight because both dialogs may contain indicators of a negative sentiment. Thus, a need exists for the sentiment classification to be sensitive to subtle indicators.

Classification is also challenging because sentiment may change within a dialog, especially in long documents. As a result, it is often necessary to characterize dialogs on a phrase-by-phrase (or even a word-by-word) basis. Thus, a need exists for the sentiment classification to accommodate classification at the various levels of resolution (e.g., dialog, sentence, utterance, phrase, word, etc.).

One approach to classification uses a single general-purpose lexicon that contains the words, phrases and characteristics (e.g., punctuation, utterance length, etc.) that indicate the sentiment of a dialog. This single lexicon approach is not practical, however, because it is difficult to include all possible indicators (i.e., large breadth requirement) while also maintaining the classification sensitivity to detect subtle indicators (i.e., large depth requirement) in a reasonably fast classification process. In addition, adapting the general-purpose lexicon to a particular environment, culture, or language is complicated and cumbersome.

Another approach to classification uses supervised machine learning to train a lexicon for classification. This approach offers more flexibility than the single lexicon approach because a lexicon may be trained to accommodate a particular type of dialog from a particular type of environment. For example, classifying the sentiment (e.g., of product or movie reviews) has been proposed using a model trained with tagged (i.e., annotated) training data. In other words, the machine learning is supervised, and requires a training set of previously classified product reviews. This approach is not efficient because it requires human participation in the creation of the tagged training data.

A need, therefore, exists for a system and method for classifying (e.g., distinguishing identifying, tagging, etc.) the sentiment of a document (e.g., dialog transcript) that is sensitive and that may be adapted to various environments using an automatic, unsupervised, machine-learning process.

SUMMARY

Accordingly, in one aspect, the present disclosure embraces a method for classifying a sentiment of a dialog transcript. The method includes a process for training a lexicon and a process for classifying the sentiment of the dialog transcript using the trained lexicon.

The training process beings with receiving a training set of dialog transcripts. The dialog transcripts are then split into two sets based on a seed: a negative set and a non-negative (e.g., neutral, positive, etc.) set. In addition, n-grams in the dialog transcripts are identified and a polarity score is computed for each n-gram. The polarity score corresponds to the likelihood of the n-gram having either a negative or a non-negative sentiment. The polarity score is computed by comparing the frequency of the n-gram in the negative set to the frequency of the n-gram in the non-negative set. After the scores for each n-gram are computed, prominent n-grams are identified based on their polarity score. The lexicon is then expanded by adding the identified prominent n-grams, which area not already in the lexicon, to the lexicon. The above process is repeated as before but with the expanded lexicon. The repetitions continue for a plurality of iterations with each iteration using the expanded lexicon from the previous iteration to obtain a trained lexicon.

The classification process begins by receiving a dialog transcript. An utterance (e.g., a sentence or phrase) is then selected in the dialog transcript and n-grams (e.g., uni-grams, bi-grams, tri-grams, etc.) in the utterance are identified. Then for each n-gram, a polarity score is obtained using the trained lexicon. The utterance is determined negative or non-negative based, at least, on the polarity scores for each n-gram. This process is repeated for other utterances in the dialog transcript. The dialog transcript is then distinguished as negative or non-negative based on the negative or non-negative utterances.

In an exemplary embodiment of the method, the dialog transcripts in a training set are all of a particular type and in some embodiments, the selection of the seed is based on this particular type. For example, dialog transcripts may include telephone calls, text chats, emails, or website posts. Accordingly, the seed may include words (e.g., frustration words, anger words, confusion words, stress words, satisfaction words, thankfulness words, relief words, happy words, etc.), phrases (e.g., put-down expressions, courteous expressions, etc.), punctuations (e.g., exclamation point, emoticon, etc.), or dialog characteristics (e.g., dialog length, utterance length, utterance repetition, etc.) that are indicative of a negative or non-negative sentiment for the particular type.

In another exemplary embodiment of the method, n-grams are identified as uni-grams, bi-grams, and tri-grams. Uni-grams are each word in the dialog transcript, bi-grams are each group of two sequential words in the dialog transcript, and tri-grams are each group of three sequential words in the dialog transcript.

In another exemplary embodiment of the method, the polarity score has a sign that corresponds to the sentiment (e.g., negative, positive) of the n-gram and an amplitude that corresponds to the likelihood that the n-gram is indicative of the sentiment. For example, a first n-gram's polarity score of −1 corresponds to negative sentiment and a second n-gram's polarity score of −3 indicates that the second n-gram is more likely to correspond to a negative sentiment than the first gram. Likewise, a positive polarity score typically indicates positive sentiment and a zero (or near zero) polarity score indicates that the n-gram is neutral or that no data is found for the n-gram in the lexicon. Accordingly, in some embodiments identifying negative or non-negative n-grams includes comparing each n-gram's polarity score to a threshold, and based on the comparison, identifying n-Crams, which have polarity-score amplitudes that exceed the threshold, as prominent n-grams.

In another exemplary embodiment of the method, the iterative training process repeats for three iterations or until an iteration results in no expansion of the lexicon.

In another exemplary embodiment of the method, the classification includes identifying n-grams in an utterance (e.g., sentence) by selecting each word in the utterance as a uni-gram, each group of two sequential words in the utterance as a bi-gram, and each group of three sequential words in the utterance as a tri-gram. In this case, a uni-gram sentiment score may be computed as the sum of the polarity scores of each uni-gram in the utterance, the bi-gram sentiment score may be computed as the sum of the polarity scores of each bi-gram in the utterance, and the tri-gram sentiment score may be computed as the sum of the polarity scores of each tri-gram in the utterance. Accordingly, the operation of determining that an utterance is negative or non-negative may be based (at least) on a comparison of the uni-gram, bi-gram and tri-gram sentiment scores (e.g., all result in a negative score implies that the utterance is negative). What is more, based on this comparison, further analysis may be required, in which case a heuristic may be applied. For example, searching for a prominent word that indicates a particular sentiment may be required to determine the sentiment. In another example, determining the sentiment of other utterances in the dialog transcript may be required to determine the sentiment of the particular utterance.

In another exemplary embodiment of the method, the classifier may distinguish the sentiment of the dialog transcript by comparing the number of negative or non-negative utterances in the dialog transcript to a threshold.

In another exemplary embodiment of the method, the distinguishing the sentiment of the dialog transcript may include by determining the position of the negative or non-negative utterances in the dialog transcript.

In another aspect, the present disclosure embraces a call center transcription system. The system includes a call recorder that records conversations between customer-service agents (i.e., agents) and customers. The system also includes a transcriber for transcribing the recorded conversations into dialog transcripts. The system further includes a sentiment classifier to determine the sentiment of the dialog transcripts. Accordingly, the sentiment classifier includes a processor and memory having stored software that when executed causes the processor to perform operations for tagging a dialog transcript according to its corresponding sentiment. The tagging operations include receiving a dialog transcript from the transcriber and retrieving a trained lexicon from the memory. Next, an utterance from the dialog transcript is selected and the utterance's uni-grams, bi-grams, and tri-grams are compared to the trained lexicon to compute a polarity for each. Next, the uni-gram polarities are summed to calculate a uni-gram sentiment score and a bi-gram sentiment score and a tri-gram sentiment score are likewise computed. Then, based on the sentiment scores for the uni-gram, bi-gram, and tri-gram, the utterance is determined as negative or non-negative. This process is repeated for other utterances in the dialog transcript in order to tag the dialog transcript as either negative or non-negative. Finally, the tagged dialog transcripts are stored in the memory.

In an exemplary embodiment of the call center transcription system, the trained lexicon used for computing sentiment scores is the product of unsupervised machine learning. The unsupervised machine learning process to create the trained lexicon includes using a seed to analyze a set of unannotated dialog transcripts and identify negative words and phrases. The identified negative words and phrases are then added to the seed to produce an expanded lexicon. The identification process is then repeated using the expanded lexicon. Negative words and phrases found in each iteration are added to the expanded lexicon. This process is repeated to produce a machine generated trained lexicon that is larger than the seed.

In another exemplary embodiment of the call center transcription system, an utterance is determined negative when the uni-gram, bi-gram, and tri-gram sentiment scores are all negative.

In another aspect, the present disclosure embraces a non-transitory tangible computer readable medium containing computer readable instructions that when executed by a processor of a computer cause the computer to execute the method for training a lexicon as described above. Specifically, a training set of dialog transcripts is received. The dialog transcripts are then split (e.g., on an utterance-by-utterance basis) into two sets based on a seed: a negative set and a non-negative (e.g., neutral, positive, etc.) set. In addition, n-grams in the dialog transcripts are identified and a polarity score is computed for each n-gram. The polarity score corresponds to the likelihood of the n-gram having either a negative or a non-negative sentiment. The polarity score is computed by comparing the frequency of the n-gram in the negative set to the frequency of the n-gram in the non-negative set. After the scores for each n-gram are computed, prominent n-grams are identified based on their polarity score. The lexicon is then expanded by adding the identified prominent n-grams, which area not already in the lexicon, to the lexicon. The above process is repeated as before but with the expanded lexicon. The repetitions continue for a plurality of iterations with each iteration using the expanded lexicon from the previous iteration to obtain a trained lexicon.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The components in the drawings are not necessarily drawn to scale and identical reference numerals throughout the several views designate the same parts.

DETAILED DESCRIPTION

Figure 1:
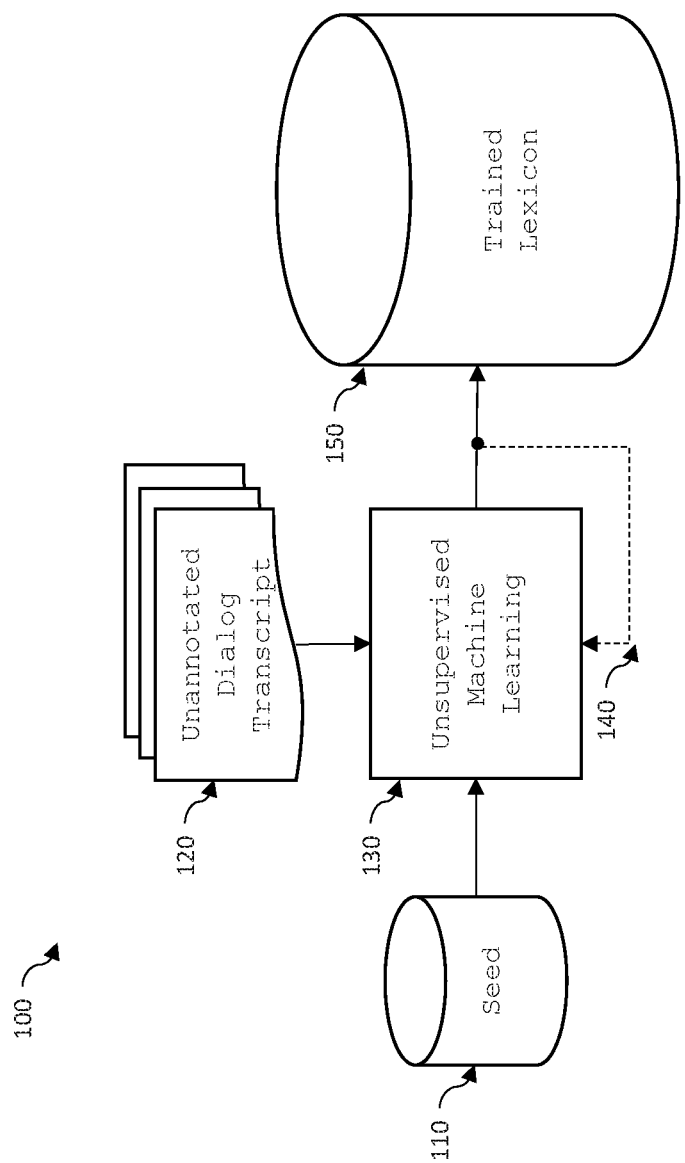
FIG. 1 schematically depicts a flowchart of a lexicon training process according to an exemplary embodiment of the present disclosure.

The present disclosure embraces automatically and iteratively creating a trained lexicon (i.e., model) from a seed (e.g., seed lexicon). A flow chart generally showing a bootstrap lexicon creation process 100 is shown in FIG. 1. As shown, the training begins with a seed 110. The seed 110 includes entries (e.g., markers of sentiment including words, phrases, characteristics, etc.) that are indicative of a particular sentiment when found in a document. The entries typically indicate a negative sentiment but lexicons may be created with entries for other types of sentiment or emotion (e.g., positive, neutral, etc.). In addition, a seed 110 may include entries for two or more sentiments. For example, a seed may include entries for both positive and negative sentiment.

The entries in the seed 110 may correspond to a particular communication environment (e.g., email, chat, website, social media, transcribed conversation, etc.). The entries in the seed 110 may also correspond to a particular business or product/service and, therefore, may include specialized terminology and/or jargon. The entries in the seed 110 may also correspond to a particular language or dialect. The entries in the seed may also include characteristics of a document that is indicative of a sentiment. For example, the length of an utterance in a dialog transcript may indicate sentiment (e.g., long utterances may imply a negative sentiment). Whatever the case, the entries may include words, phrased, and/or punctuation indicative of a sentiment.

The entries in the seed 110 may include an associated polarity that describes the likelihood that the entry is associated with a particular sentiment. For example, the word "very" may have a slightly negative polarity, the word "ridiculous" may have a moderately negative polarity, and the phrase (bi-gram) "very ridiculous" may have an strongly negative polarity.

The seed only includes a basic set of entries for roughly classifying the documents. To expand and refine the lexicon, a set of unannotated dialog transcripts (i.e., training set) 120 are used with an unsupervised machine learning algorithm 130. The training set 120 typically includes exemplary dialog transcripts (e.g., 20-50 thousand transcripts). The transcripts may include multiple speakers or may only include the transcript of a particular speaker or speaker class (e.g., customers). For example, the transcript of the particular speaker may be obtained through a diarization process to separate speakers in a conversation. The transcripts in the training set 120 are typically from the same communication environment. For example, the transcripts may all be voice transcripts. In some cases, the type of communication environment determines a particular seed 110 used for the unsupervised learning 130.

In the training, the machine-learning algorithm 130 compares elements (e.g., n-grams) of a transcript with the seed to determine (roughly) the transcript sentiment (e.g., on an utterance-by-utterance basis). For example, a set of negative transcripts obtained from the training set 120 using the seed 110. The algorithm identifies words and phrases in the negative transcripts that appear often but that are not represented in the seed. The seed is then expanded by adding the identified words and phrases. The process then repeats 140. In the next iteration, the expanded lexicon is used to obtain a new set of negative transcripts from the training set 120. Again, words and phrases that are not in the expanded lexicon are added and the process repeats using the further expanded lexicon. Typically, only a few iterations are necessary to obtain a trained lexicon 150. For example, after three iterations no new words and phrases can be found in the training set that are not already in the expanded lexicon. Accordingly, in some embodiments, the training may end after a number of iterations, while in others it the termination may depend on a threshold number of words added to the lexicon. For example, if the number of words added to the lexicon in an iteration falls below the threshold then the training is terminated and the expanded lexicon of the previous iteration becomes the trained lexicon 150.

Figure 2:
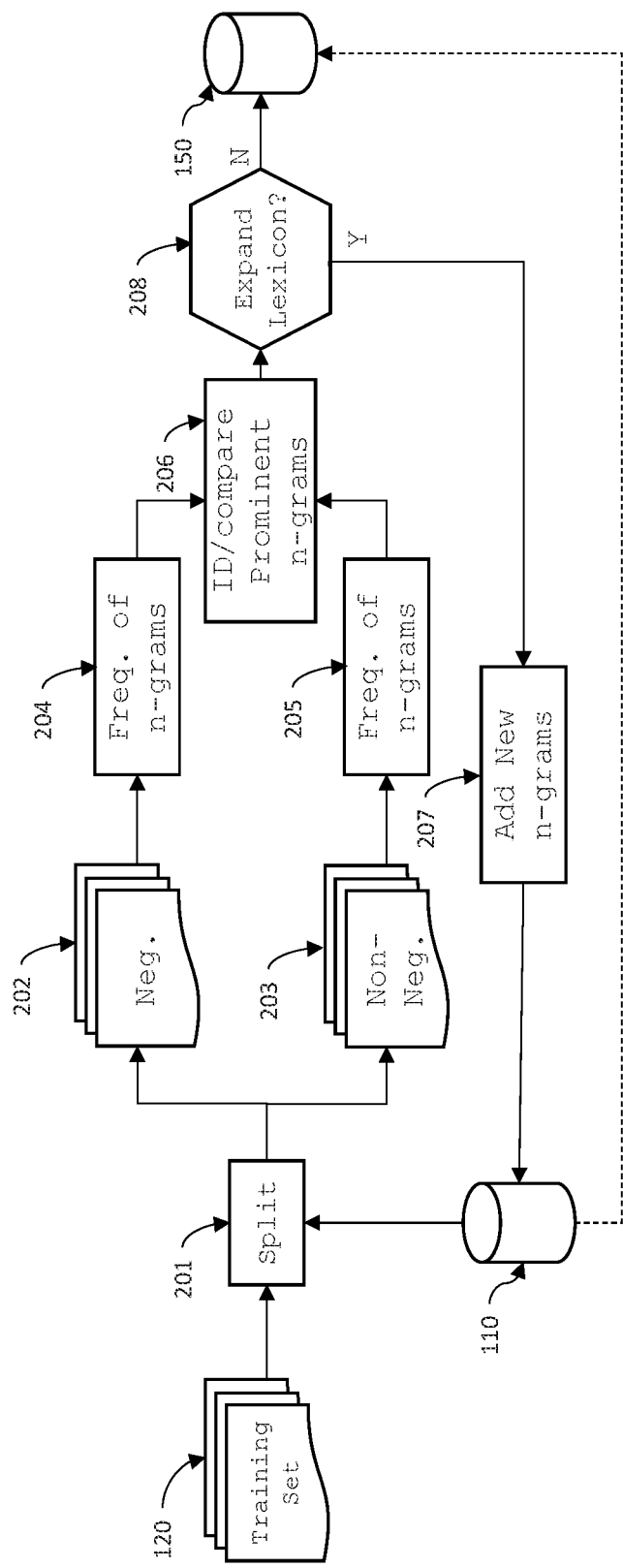
FIG. 2 graphically depicts a flowchart further detailing the lexicon training process of FIG. 1 according to an implementation of the present disclosure.

The details of an exemplary unsupervised machine-learning algorithm 130 for training is depicted in FIG. 2. In summary, a training set of dialog transcripts is provided. The utterances in the given training set are then split into two sets: a negative set and a non-negative (e.g., neutral, positive, etc.) set. The splitting is based on a seed 110 that roughly detects negative utterances. Based on the split, a sentiment polarity is computed and assigned for each n-gram. The polarity score corresponds to the likelihood of the n-gram having either a negative or a positive sentiment tendency. The polarity score is computed by comparing the frequency of the n-gram in the negative set to the frequency of the n-gram in the non-negative set. After the scores for each n-gram are computed, prominent n-grams are identified based on their polarity score. Consequently, a lexicon is constructed that contains all uni-grams, bi-grams, and tri-grams that are sentimentally significant (i.e., n-grams with sentiment polarity magnitude above a threshold).

As shown in FIG. 2, the training set 120 is split 201 into negative 202 and non-negative sentiment 203 transcripts (or utterances) using the seed 110. An n-gram analysis is then performed on the negative set 202 and the non-negative set 203.

N-grams are groups of consecutive n-words in a transcript (or utterance). For example, the utterance "I'm not very happy" has: 1-grams (i.e., uni-grams) of "I'm.", "not", "very", and "happy"; 2-grams (i.e., bi-grams) of "I'm not", "not very", and "very happy"; and 3-grams (i.e., trigrams) of "I'm not very", and "not very happy." Typically the term n-gram implies 1-grams, 2-grams, and 3-grams but it is anticipated that the groups implied by the term may be expanded (e.g., n=1, 2, 3, 5), diminished (e.g., n=1, 2), or otherwise different (e.g., n=2, 3).

The n-gram analysis discovers prominent n-grams for the negative set and the non-negative set. This analysis typically includes determining the frequency (i.e., number of appearances) of a particular n-gram in the negative set 204 and the frequency of a particular n-gram in the non-negative set 205. From this analysis, the prominent n-grams in each set may be determined and compared 206 in order to determine the likely sentiment of the particular n-gram. For example, if "ridiculous" appears frequently in the negative set but is rarely found (or not found) in the positive set, then it is likely that "ridiculous" is an indicator of a negative sentiment. Accordingly, the uni-gram "ridiculous" may be added to the lexicon with a polarity score (i.e., polarity) that describes its negative likelihood. The polarity is based on the comparison between the frequencies of the n-grams in the negative set with the frequencies of the n-grams in the non-negative set.

If prominent n-grams are discovered, then it is possible to expand the lexicon 208. Accordingly, the new n-grams found in the analysis may be added 207 to the seed to form an expanded lexicon. This process continues for a fixed number of iterations or until the lexicon ceases to expand (or expands below an amount). The lexicon returned after the final iteration is the trained lexicon and includes many more elements than the seed. The trained lexicon may then be used for classifying transcripts.

Figure 3:
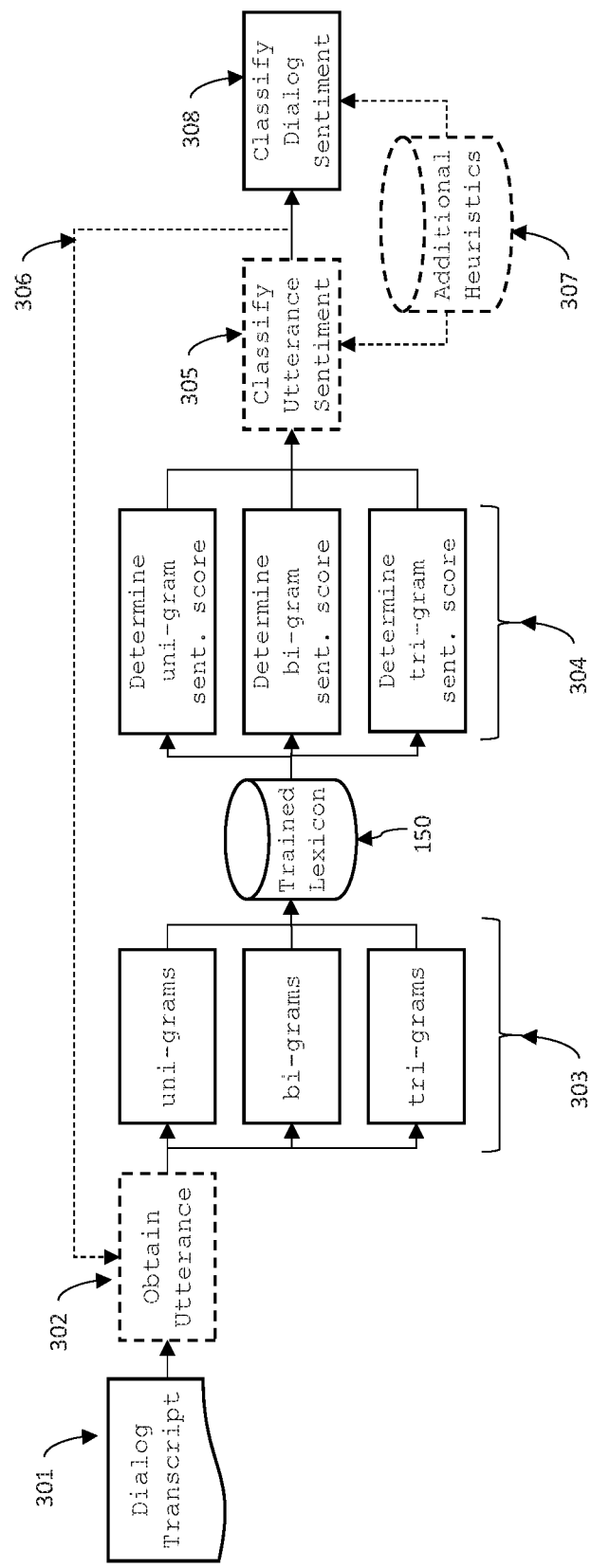
FIG. 3 graphically depicts a flowchart of a sentiment classification process according to an embodiment of the present disclosure.

An exemplary classifying (e.g., tagging, distinguishing, etc.) process is illustrated in FIG. 3. In summary, the classification process begins by receiving a dialog transcript and scanning its utterances. For each utterance, three scores are computed, corresponding to the uni-grams, bi-grams, and tri-grams of the utterance. The score for each n-gram is computed using the trained lexicon for obtaining the sentiment polarities that are associated to the utterance's n-grams, summing all these polarities, and normalizing the summed result by the utterance's length. The utterance is then determined negative, neutral, or positive based on these three scores. This process is repeated for all utterances in the dialog transcript. The dialog transcript is then distinguished as negative, neutral, or positive based on the sentiment scores of its utterances.

As shown in FIG. 3, the process beings with receiving a dialog transcript 301. The transcript may be obtained in real time or retrieved from a memory. The transcript may be acquired from a variety of environments (e.g., voice, email, chat, forum, etc.). For example, voice transcripts may be obtained by applying voice-to-text algorithms to recorded conversations. The entire dialog transcript may be classified in its entirety or may be divided into smaller parts (e.g., sentence, phrase, utterance, word, etc.) for classification. As shown in FIG. 3, an utterance may be obtained 302 for sentiment classification. The n-grams (e.g., uni-grams, bi-grams, tri-grams, etc.) of the utterance are obtained and compared to a trained lexicon 150 to obtain a polarity score for each utterance.

As mentioned previously the polarity score is typically a signed numerical value that corresponds to the sentiment. For example, positive polarity scores may correspond to a positive sentiment, while negative polarity scores may correspond to a negative sentiment. The numerical value (i.e., amplitude) of the polarity score typically corresponds to the likelihood that the n-gram indicates a sentiment. For example, an n-gram with a polarity score of −4 is more likely to indicate a negative sentiment than an n-gram with a polarity score of −2. The polarity scores are obtained from the lexicon, and n-grams not in the lexicon may be assigned a neutral (e.g., zero) polarity score.

After the polarity scores are obtained, a sentiment score is determined for each set of n-grams having the same n value 304. For example, a uni-gram sentiment score is computed by summing all the polarity scores for each uni-gram (i.e., n=1 n-gram) in the utterance. Likewise, a bi-gram sentiment score and a tri-gram sentiment score are calculated. In some embodiments, the sentiment scores may be further processed to normalize the data or to map the data to a particular range (e.g., $-1 \leq score \leq +1$).

The sentiment scores for the utterance may be used to classify the sentiment of the utterance 305. For example, a comparison of the scores may show that an utterance has negative sentiment scores for uni-grams, bi-grams, and tri-grams. This agreement between the scores may indicate that the utterance has a negative sentiment (i.e., a negative utterance). On the other hand, an utterance having sentiment scores for uni-grams, bi-grams, and tri-grams with different values (e.g., some positive and some negative) may not indicate a sentiment clearly. In this case, it may be necessary to apply additional processing and/or heuristics 307 to determine the sentiment of the utterance. In another example, the sentiment scores for the n-grams may be aggregated (e.g., along with an additional heuristic).

Heuristics may be applied to aid in the sentiment classification of an utterance 307. Heuristics may include characteristics that, when combined with the outcome of the sentiment score analysis, improve the confidence of a particular sentiment classification. For example, a prominent word or phrase in an utterance may clearly indicate a particular sentiment and thus, may support or override the results of the scores. In another example, the sentiment of an utterance in a dialog transcript may be determined based on the sentiment of other utterances in the dialog transcript. For example, if an utterance follows a series of utterances that are classified as negative, it may be more likely that the utterance is also negative.

The classification of the utterances 305 may help determine the sentiment classification of the dialog transcript 308. For example, the number of negative utterances the dialog transcript may exceed a threshold. In another example, each utterance may be assigned an utterance sentiment score. The utterance sentiment scores for a dialog may be aggregated (e.g., summed) to compute a dialog sentiment score. Then based on the dialog transcript sentiment score by a comparison of the score to a threshold), the dialog transcript may be classified as having a particular sentiment 308.

In some embodiments, the results of the classification are made available to a user via a user interface (UI). For example, a dialog transcript may be displayed with an indication of the sentiment score on a transcript level, sentence level, or utterance level. Viewing the transcript with a sentiment score indicated on a sentence level, for example, may show when a sentiment changes in a conversation. This information may be important for employee training, the formation of scripts, or for marketing/customer-retention practices.

Figure 4:
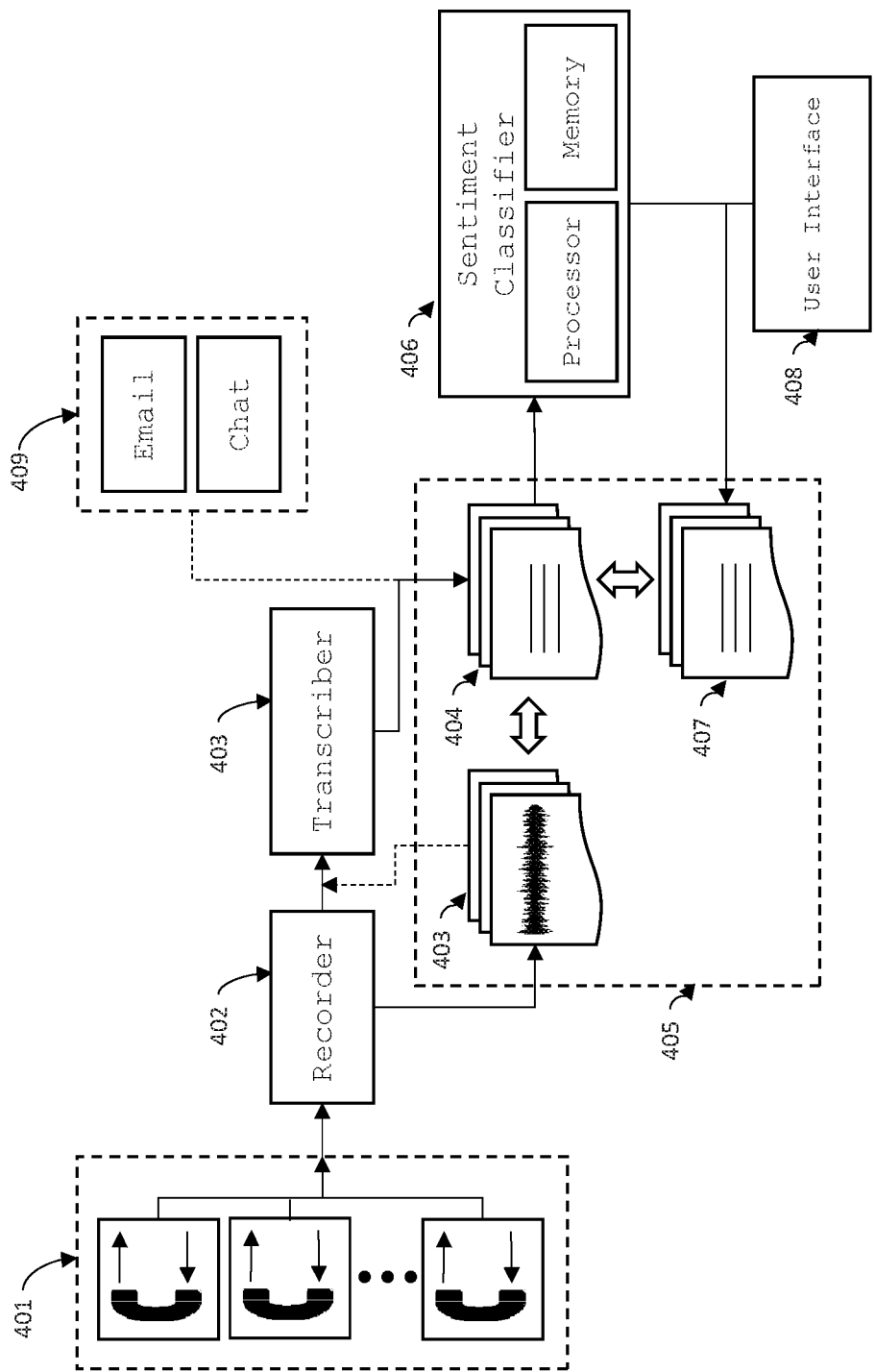
FIG. 4 graphically depicts a call center transcription system with sentiment tagging according to an embodiment of the present disclosure.

FIG. 4 schematically depicts a block diagram of a call transcription system for tagging transcribed conversations between customer-service agents (i.e., agents) and customers in a call center. The system includes a plurality of telephones 401 used by agents to converse with customers. A recorder 402 monitors and records the conversations in audio format 403 to a storage system (e.g., database system) 405. The conversations are transcribed from speech to text (STT) using an automatic transcriber 403. This may be accomplished automatically as the conversations are recorded (e.g., real time) or may be accomplished later (e.g., batch mode). The transcription may be accomplished algorithmically (e.g., speech recognition) or via a human that transcribes the speech manually or by voice (e.g., voice writing). In some cases, the transcriber also adds information about the speaker to the transcription (e.g., role, name, customer identification, etc.) and may separate the transcription by speaker (e.g., speaker segmentation). In any case, each transcription results in a text document 404 that is stored on the storage system 405.

The system also includes a sentiment classifier 406 that includes a memory and a processor (e.g., a server computer). The sentiment classifier runs software to enable the classifier to perform the classification process described thus far. The sentiment classifier 406 may obtain dialog transcriptions from the storage system 405 or may receive them directly from the output of the transcriber 403 (e.g., in real time). The sentiment classifier 406 determines the sentiment of the dialog transcript 404. The classifier may then distinguish the dialog transcript by tagging all or portions (e.g., sentences) with indications of the sentiment. The tagged dialog transcripts 407 may then be stored (e.g., in the storage system, on the sentiment classifier memory, etc.) or otherwise be made available to a user interface 408. The system may also obtain transcripts from dialogs other than telephone conversations. For example, emails and/or chats 409 may be classified by sentiment as described above as well.

The sentiment classified dialog transcripts 407 may be correlated with a customer's identity to facilitate customer service. For example, upon receiving a call from a customer, an agent may be supplied with a transcript of a previous interaction with the customer. The supplied transcript may be labeled or arranged by sentiment to help the agent gauge the customer's likely emotion on the call. In another example, a script may be supplied to an agent for a call with a customer based on a sentiment determined from a previous interaction with the customer. In still another example, the sentiment determined for a customer may help the routing of calls. For example, a customer with a history of negative sentiment may be routed to an agent with experience handling this type of customer.

In the specification and/or figures, typical embodiments have been disclosed. The present disclosure is not limited to such exemplary embodiments. The use of the term "and/or" includes any (and all) combinations of one or more of the associated listed items. Unless otherwise noted, specific terms have been used in a generic and descriptive sense and not for purposes of limitation.

The invention claimed is:

1. A method for classifying a sentiment of a dialog transcript, the method comprising:
    training a lexicon, wherein the training comprises:
        receiving a training set of dialog transcripts;
        splitting the training set into a negative set and a non-negative set based on a seed;
        identifying n-grams in the dialog transcripts;
        computing, for each n-gram, a polarity score that corresponds to the likelihood of the n-gram having either a negative or a non-negative sentiment, wherein the computing the polarity score for a particular n-gram comprises comparing the frequency of the particular n-gram in the negative set to the frequency of the particular n-gram in the non-negative set;
        identifying prominent n-grams based on each n-gram's polarity score;
        expanding the lexicon by adding the prominent n-grams, which are not already in the lexicon, to the lexicon; and
        repeating the splitting, computing, identifying, and expanding for a plurality of iterations to obtain a trained lexicon, wherein the splitting for each iteration uses the expanded lexicon from the previous iteration; and
    classifying the sentiment of the dialog transcript using the trained lexicon wherein the classifying comprises:
        receiving a dialog transcript;
        selecting an utterance in the dialog transcript;
        identifying n-grams in the utterance;
        obtaining a polarity score for each n-gram using the trained lexicon;
        determining the utterance is negative or non-negative based, at least, on the polarity scores for each n-gram;
        repeating the selecting, identifying, computing, and determining for other utterances in the dialog transcript; and
        distinguishing the sentiment of the dialog transcript as negative or non-negative based on the negative or non-negative utterances determined in the dialog transcript.

2. The method according to claim 1, wherein the dialog transcripts in the training set are all of a particular type.

3. The method according to claim 2, further comprising: selecting the seed based on the particular type.

4. The method according to claim 3, wherein the particular type is a telephone call, a text chat, an email, or a website post.

5. The method according to claim 3, wherein the seed comprises words, phrases, punctuations, or dialog characteristics that, for the particular type, are indicative of a negative or non-negative sentiment.

6. The method according to claim 1, wherein the identifying n-grams in the dialog transcripts comprises:
    for each dialog transcript:
        selecting each word in the dialog transcript as a uni-gram;
        selecting each group of two sequential words in the dialog transcript as a bi-gram;
        selecting each group of three sequential words in the dialog transcript as a tri-gram; and
        identifying n-grams in the dialog transcript as the uni-grams, bi-grams, and tri-grams.

7. The method according to claim 1, wherein:
the polarity score has a sign that corresponds to the sentiment of the n-gram, and wherein:
the polarity score has an amplitude that corresponds to the likelihood that the n-gram is indicative of the sentiment.

8. The method according to claim 7, wherein the identifying prominent n-grams based on each n-gram's polarity score, comprises:
comparing the amplitude each n-gram to a threshold, and
identifying prominent n-grams as n-grams having a polarity-score amplitude larger than the threshold.

9. The method according to claim 1, wherein repeating the splitting, computing, identifying, and expanding for a plurality of iterations to obtain a trained lexicon, comprises:
repeating for three iterations or until an iteration results in no expansion of the lexicon.

10. The method according to claim 1, wherein the identifying n-grams in the utterance comprises:
selecting each word in the utterance as a uni-gram;
selecting each group of two sequential words in the utterance as a bi-gram; and
selecting each group of three sequential words in the utterance as a tri-gram.

11. The method according to claim 10, wherein determining the utterance is negative or non-negative based, at least, on the polarity scores for each n-gram, comprises:
computing a uni-gram sentiment score as the sum of the polarity scores of each uni-gram in the utterance;
computing a bi-gram sentiment score as the sum of the polarity scores of each bi-gram in the utterance; and
computing a tri-gram sentiment score as the sum of the polarity scores of each tri-gram in the utterance.

12. The method according to claim 11, wherein the determining the utterance is negative or non-negative based, at least, on the polarity scores for each n-gram, further comprises:
comparing the uni-gram, bi-gram, and tri-gram sentiment scores.

13. The method according to claim 12, wherein the determining the utterance is negative or non-negative based, at least, on the polarity scores for each n-gram, further comprises:
based on the comparison applying a heuristic to determine that the utterance is negative or non-negative.

14. The method according to claim 13, wherein the applying a heuristic is:
searching for a prominent word indicating sentiment, or
determining the sentiment of other utterances in the dialog transcript.

15. The method according to claim 1, wherein the distinguishing the sentiment of the dialog transcript as negative or non-negative based on the negative or non-negative utterances determined in the dialog transcript, comprises:
comparing the number of negative or non-negative utterances in the dialog transcript to a threshold.

16. The method according to claim 1, wherein the distinguishing the sentiment of the dialog transcript as negative or non-negative based on the negative or non-negative utterances determined in the dialog transcript, comprises:
determining the positions negative utterances in the dialog transcript.

17. A call center transcription system comprising:
a call recorder recording conversations between agents and customers in a call center;
a transcriber receiving the recorded conversations and creating dialog transcripts corresponding to the conversations; and
a sentiment classifier comprising a processor and a memory, wherein the processor executes software stored in the memory to:
receive a dialog transcript from the transcriber;
retrieve a trained lexicon from the memory, wherein the trained lexicon is the product of unsupervised machine learning, wherein the unsupervised machine learning comprises:
analyzing, using a seed, a set of unannotated dialog transcripts to identify negative words and phrases;
adding identified negative words and phrases to the seed to produce an expanded lexicon;
analyzing the set of unannotated dialog transcripts using the expanded lexicon to find new negative words and phrases;
adding the new negative words and phrases to the expanded lexicon to produce a further expanded lexicon; and
repeating the analyzing and adding to produce the machine-generated lexicon that is larger than the seed;
select an utterance from the dialog transcript;
compute, using the trained lexicon, polarities for each uni-gram, bi-gram, and tri-gram in the utterance;
calculate a uni-gram sentiment score, a bi-gram sentiment score, and a tri-gram sentiment score that are based on the sum of the polarity scores for each uni-gram, bi-gram, and tri-gram respectively;
determine that the utterance is negative or non-negative based on the uni-gram, bi-gram and tri-gram sentiment scores;
repeat selecting, computing, calculating, and determining for other utterances in the dialog transcript;
tag the dialog transcript as negative or non-negative based on the determined negative utterances; and
store the tagged dialog transcripts to the memory.

18. The call center transcription system according to claim 17, wherein an utterance is determined negative when the uni-gram, bi-gram, and tri-gram sentiment scores are all negative.

19. A non-transitory computer readable medium containing program instructions that upon execution by a computer processor cause the processor to:
receive a training set of dialog transcripts;
split the training set into a negative set and a non-negative set based on a seed;
identify n-grams in the dialog transcripts;
compute, for each n-gram, a polarity score that corresponds to the likelihood of the n-gram having a negative or a non-negative sentiment, wherein the computing the polarity score for a particular n-gram comprises comparing the frequency of the particular n-gram in the negative set to the frequency of the particular n-gram in the non-negative set;
identify prominent n-grams based on each n-gram's polarity score;
expand the lexicon by adding the prominent n-grams, which are not already in the lexicon, to the lexicon; and
repeat the splitting, computing, identifying, and expanding for a plurality of iterations to obtain a trained lexicon, wherein the splitting for each iteration uses the expanded lexicon from the previous iteration.

* * * * *